(12) United States Patent
Lazarini

(10) Patent No.: US 9,457,714 B1
(45) Date of Patent: Oct. 4, 2016

(54) VEHICLE HORN CONTROL SYSTEM

(71) Applicant: GM GLOBAL TECHNOLOGY OPERATIONS LLC, Detroit, MI (US)

(72) Inventor: Marcelo V. Lazarini, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/731,926

(22) Filed: Jun. 5, 2015

(51) Int. Cl.
*G08B 3/00* (2006.01)
*B60Q 5/00* (2006.01)
*B60R 16/02* (2006.01)
*G08B 3/10* (2006.01)

(52) U.S. Cl.
CPC .............. *B60Q 5/001* (2013.01); *B60R 16/02* (2013.01); *G08B 3/10* (2013.01)

(58) Field of Classification Search
None
See application file for complete search history.

(56) References Cited

U.S. PATENT DOCUMENTS

| | | | | | |
|---|---|---|---|---|---|
| 4,383,249 | A | * | 5/1983 | Frigo | G08B 3/10 340/384.7 |
| 5,266,921 | A | * | 11/1993 | Wilson | B06B 1/023 340/384.5 |
| 7,205,493 | B1 | * | 4/2007 | Bell, Jr. | B60Q 5/001 200/512 |
| 2007/0103276 | A1 | * | 5/2007 | Kousaka | G10K 9/13 340/388.1 |

FOREIGN PATENT DOCUMENTS

JP        61081251 A  *  4/1986

* cited by examiner

*Primary Examiner* — Thang Tran
(74) *Attorney, Agent, or Firm* — Reising Ethington, P.C.; Christopher Devries

(57) ABSTRACT

A system for controlling a vehicle horn includes a current delivery circuit and a control circuit that controls the current delivery circuit in response to a horn activation signal received from a horn pad switch. The control circuit includes a control module that generates a horn termination signal if a duration of the horn activation signal exceeds a predetermined duration. The horn termination signal is configured to cause the current delivery circuit to prevent delivery of current to the horn to deactivate the horn. The control circuit further includes a bypass circuit configured to cause the current delivery circuit to deliver current to the horn to activate the horn responsive to the horn activation signal in the absence of the horn termination signal.

20 Claims, 6 Drawing Sheets

VEHICLE HORN CONTROL SYSTEM

FIELD

The present invention relates generally to a vehicle system. More specifically, the invention relates to a system for controlling a vehicle horn that enables a greater range of use of the horn while protecting the horn from damage.

BACKGROUND

Vehicle horns are provided to enable a vehicle operator to warn other vehicles and pedestrians of a potential collision or other dangerous condition. A typical vehicle horn employs an electromagnet that is actuated in response to movement of a horn pad switch to cause oscillating movement in a metal diaphragm and produce a sound. If the horn is activated for too long of a period, damage to the horn can occur. Therefore, a control module is often inserted between the horn pad switch and the horn to permit improved control of the horn in response to the horn pad switch and, in particular, to enable the horn to be deactivated if the horn pad switch becomes stuck. Although the control module protects the horn from damage, it also prevents some uses of the horn. In some countries and cultures, the horn is applied for relatively short bursts as a warning or greeting. The control module, however, includes a debouncing circuit that is used to prevent generation of multiple signals during actuation of the horn pad switch. This circuit forces a relatively long actuation of the horn pad switch to activate the vehicle horn and prevents relatively short actuations of the horn pad switch from activating the horn.

SUMMARY

According to one embodiment, there is provided a system for controlling a vehicle horn including a current delivery circuit configured to control delivery of current to the vehicle horn and a control circuit configured to control the current delivery circuit in response to a horn activation signal received from a horn pad switch. The control circuit comprises a control module configured to generate a horn termination signal if a duration of the horn activation signal exceeds a first predetermined duration. The horn termination signal is configured to cause the current delivery circuit to prevent delivery of current to the horn to deactivate the horn. The control circuit further includes a bypass circuit configured to cause the current delivery circuit to deliver current to the horn to activate the horn responsive to the horn activation signal in the absence of the horn termination signal.

According to another embodiment, there is provided a system for controlling a vehicle horn including a current delivery circuit configured to control delivery of current to the vehicle horn and a control circuit configured to control the current delivery circuit in response to a horn activation signal received from a horn pad switch. The control circuit comprises control means for generating a horn termination signal if a duration of the horn activation signal exceeds a first predetermined duration. The horn termination signal is configured to cause the current delivery circuit to prevent delivery of current to the horn to deactivate the horn. The control circuit further includes bypass means for causing the current delivery circuit to deliver current to the horn to activate the horn responsive to the horn activation signal in the absence of the horn termination signal.

According to another embodiment, there is provided a vehicle horn assembly including a horn, a horn pad switch and a system for controlling the horn including a current delivery circuit configured to control delivery of current to the vehicle horn and a control circuit configured to control the current delivery circuit in response to a horn activation signal received from a horn pad switch. The control circuit comprises a control module configured to generate a horn termination signal if a duration of the horn activation signal exceeds a first predetermined duration. The horn termination signal is configured to cause the current delivery circuit to prevent delivery of current to the horn to deactivate the horn. The control circuit further includes a bypass circuit configured to cause the current delivery circuit to deliver current to the horn to activate the horn responsive to the horn activation signal in the absence of the horn termination signal.

DRAWINGS

Preferred exemplary embodiments will hereinafter be described in conjunction with the appended drawings, wherein like designations denote like elements, and wherein.

DESCRIPTION

The system described herein may be used to control a vehicle horn in a manner that enables a greater range of use of the horn while also protecting the horn from damage resulting from prolonged use of the horn. In particular, the system employs a control module to prevent delivery of current to the horn if the horn pad switch becomes stuck or is activated for too long of a period while also employing a bypass circuit that allows relatively short activations of the horn that would otherwise be precluded by the control module's debouncing circuit.

Figure 1:
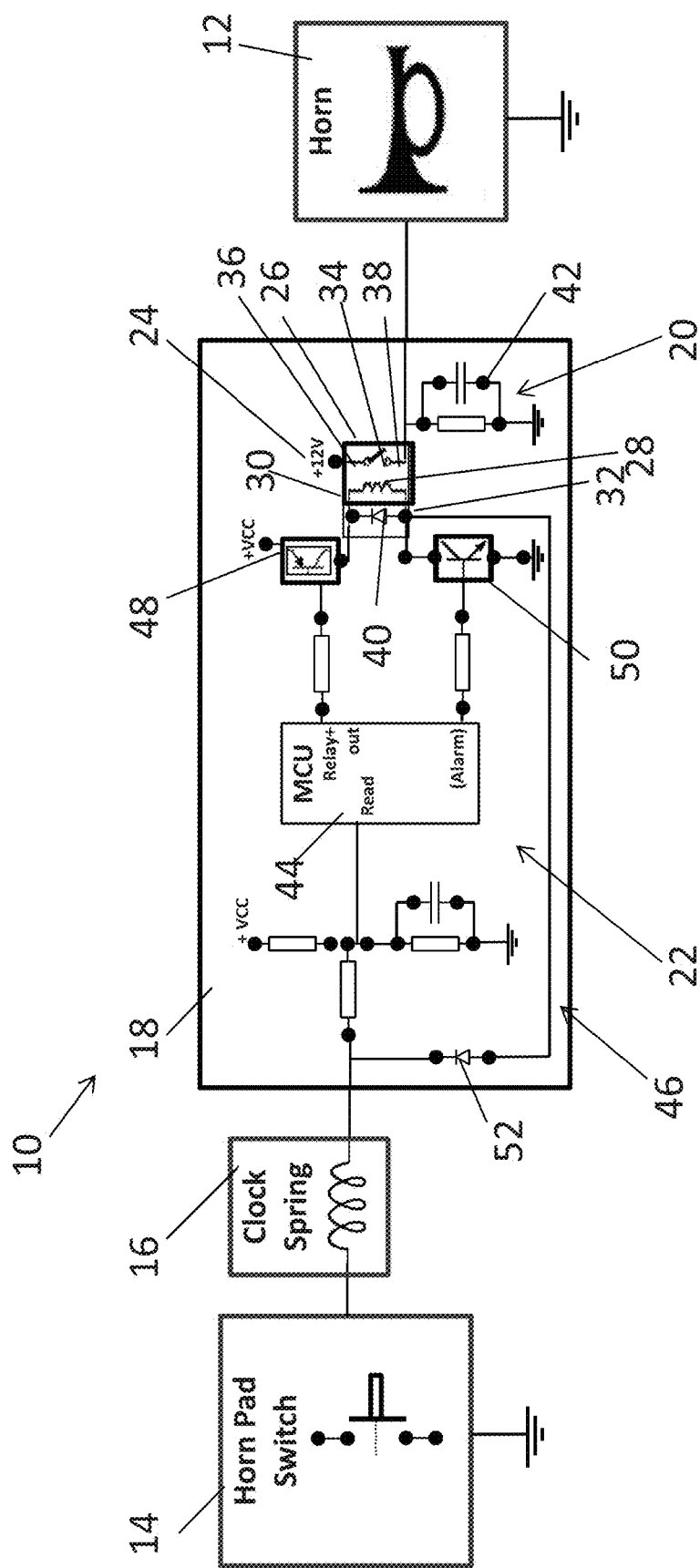
FIG. 1 is a schematic view of an embodiment of a vehicle horn assembly including one embodiment of a system for controlling the vehicle horn.

Referring now to the drawings wherein like reference numerals are used to identify identical components in the various views, FIG. 1 illustrates one embodiment of a vehicle horn assembly 10. Assembly 10 may include a horn 12, a horn pad switch 14, a clock spring 16 and one embodiment of a system 18 for controlling horn 12.

Horn 12 generates a sound responsive to activation of switch 14 by a vehicle user and may be used to issue warnings to other vehicles or pedestrians or to otherwise communicate with other vehicles and pedestrians (e.g., to communicate a greeting). Horn 12 may have a conventional structure including a metal diaphragm and an electromagnet.

Current supplied to the electromagnet causes the diaphragm to move towards the electromagnet until the diaphragm disengages a contact to stop the flow of current to the electromagnet. When the flow of current stops, the diaphragm springs back away from the electromagnet. Current is then supplied to the electromagnet again and the cycle repeats causing oscillating movement of the diaphragm and creating sound waves.

Horn pad switch 14 is used to activate the horn. Switch 14 may be a membrane switch that is typically located behind a relatively soft and flexible portion of the steering wheel housing. Pressure applied to this portion of the steering wheel housing causes the membrane switch to flex and close a pair of contacts resulting in generation of a horn activation signal.

Clock spring 16 provides an electrical connection between horn pad switch 14 and system 18 and may also provide an electrical connection between the vehicle electrical system and other steering wheel mounted components and controls such as airbags, cruise control and radio controls. Clock spring 16 comprises an expandable and retractable coil that may be disposed between the vehicle steering wheel on which horn pad switch 14 is mounted and the steering column and maintains the connection between switch 14 and system 18 despite rotation of the steering wheel.

System 18 controls horn 12 responsive to activation of horn pad switch 14. System 18 may includes a current delivery circuit 20 and a control circuit 22 for controlling current delivery circuit 20.

Current delivery circuit 20 controls delivery of current from a current source 24 to horn 12. Circuit 20 may comprise a relay 26. Relay 26 may include an inductive coil 28 having terminals 30, 32 at either end of the coil 28 and a single pole, single throw contact 34 having one terminal 36 connected to the current source 24 and another terminal 38 connected to horn 12. Current through coil 28 closes contact 34 to deliver current from current source 24 to horn 12. A diode 40 may be connected across terminals 30, 32 in parallel with coil 28 with a cathode of the diode 40 connected to terminal 30 and an anode of the diode 40 connected to terminal 32. A resistor-capacitor (RC) circuit 42 may be coupled to terminal 38 of contact 34.

Control circuit 22 is provided to control current delivery circuit 20 in response to a horn activation signal received from horn pad switch 14 upon actuation of switch 14. Circuit 22 includes control means, such as a control module 44, for generating a horn termination signal if the duration of the horn activation signal exceeds a predetermined duration in order to prevent damage to the horn 12. Circuit 22 also includes bypass means, such as bypass circuit 46, for causing current delivery circuit 20 to deliver current to horn 12 to activate horn 12 responsive to the horn activation signal in the absence of the horn termination signal. Control circuit 22 may also include transistors 48, 50.

Control module 44 generates control signals to control switches 48, 50 in order to activate and deactivate horn 12. Module 44 may include a processing device and a memory device. The processing device may include any type of suitable electronic processor (e.g., a microprocessor, a microcontroller, an application specific integrated circuit (ASIC), etc.) that executes instructions for software, firmware, programs, algorithms, scripts, etc. The memory device may include any type of suitable electronic memory means and may store a variety of data and information including, for example, look-up tables and other data structures; software, firmware, programs, algorithms, scripts, and other electronic instructions, component characteristics and background information, etc. Control module 44 may be electronically connected to other vehicle devices and modules via I/O devices and suitable connections, like a communications bus, so that they can interact as required. Depending on the particular embodiment, control module 44 may be a stand-alone electronic module, it may be incorporated or included within another electronic module in the vehicle (e.g., a steering control module or body control module), or it may be part of a larger network or system.

Module 44 is configured to generate a horn termination signal if the duration of the horn activation signal from horn pad switch 14 exceeds a predetermined duration. Prolonged activation of horn 12 can cause damage to horn 12. Therefore, if horn pad switch 14 becomes stuck or is actuated for too long of a period, control module 44 generates a horn termination signal to halt delivery of current to horn 12. This signal may be output from module 44 to a base or gate terminal of transistor 48 to open transistor 48 and prevent the delivery of current to coil 28 of relay 26, thereby opening contact 34 of relay 26 and preventing the delivery of current to horn 12 from current source 24. In the absence of the horn termination signal, transistor 48 is normally closed. Module 44 may also be configured to generate alarm signals to cause horn 12 to sound even in the absence of actuation of horn pad switch 14. Module 44 may generate the alarm signals to, for example, cause horn 12 to sound an alarm in the event of an attempt to break into the vehicle in which assembly 10 is installed. These signals may be output from module 44 to a base or gate terminal of transistor 50 to close transistor 50. As long as transistor 48 is also closed, this action will establish a current path through transistors 48, 50 and coil 28 in order to close contact 34 and permit delivery of current to horn 12 to sound horn 12.

Bypass circuit 46 causes, in the absence of a horn termination signal from module 44, current delivery circuit 20 to deliver current to horn 12 in response to a horn activation signal from horn pad switch 14 in order to activate horn 12. Because bypass circuit 46 lacks the debouncing circuit of control module 44, bypass circuit 46 enables activation of horn 12 despite relatively short actuations of horn pad switch 14 that a control module would ignore. Bypass circuit 46 defines a current pathway between horn pad switch 14 and terminal 32 of coil 28 in relay 26. In this manner, bypass circuit 46 bypasses module 44 and actuation of horn pad switch 14 establishes a closed circuit between switch 14 and current source 24—as long as a horn termination signal does not open transistor 48—to allow current to flow through coil 28 even when transistor 50 is open. Bypass circuit 46 may include a diode 52 between horn pad switch 14 and terminal 32 with the anode of diode 52 coupled to terminal 32 and the cathode of diode 52 coupled to clock spring 16 such that current can only flow from terminal 32 to the clock spring 16 and to ground through switch 14 when switch 14 is actuated.

Transistors 48, 50 are provided to allow or prevent the flow of current to coil 28 under predefined conditions. Transistors 48, 50 may each comprise bipolar junction transistors. Transistor 48 may comprise a PNP transistor with a collector terminal coupled to terminal 30 of coil 28, an emitter terminal coupled to a current source and a base terminal coupled to an output terminal of control module 44. Transistor 50 may comprise a NPN transistor with a collector terminal coupled to terminal 32 of coil 28, an emitter terminal coupled to ground and a base terminal coupled to an output terminal of control module 44. As noted above, transistor 48 may be closed in the absence of a horn termination signal from control module 44. Transistor 50 may be open in the absence of an alarm signal from control module 44. When both of transistors 48, 50 are closed, a current path is created and current flows through coil 28 to close contact 34 and cause delivery of current from current source 24 to horn 12. When transistor 48 is closed, but transistor 50 is open, a horn activation signal from horn pad switch 14 creates a separate current pathway through bypass circuit 46 such that current will flow through coil 28 to close contact 34 and cause delivery of current from current source 24 to horn 12.

Figure 2:
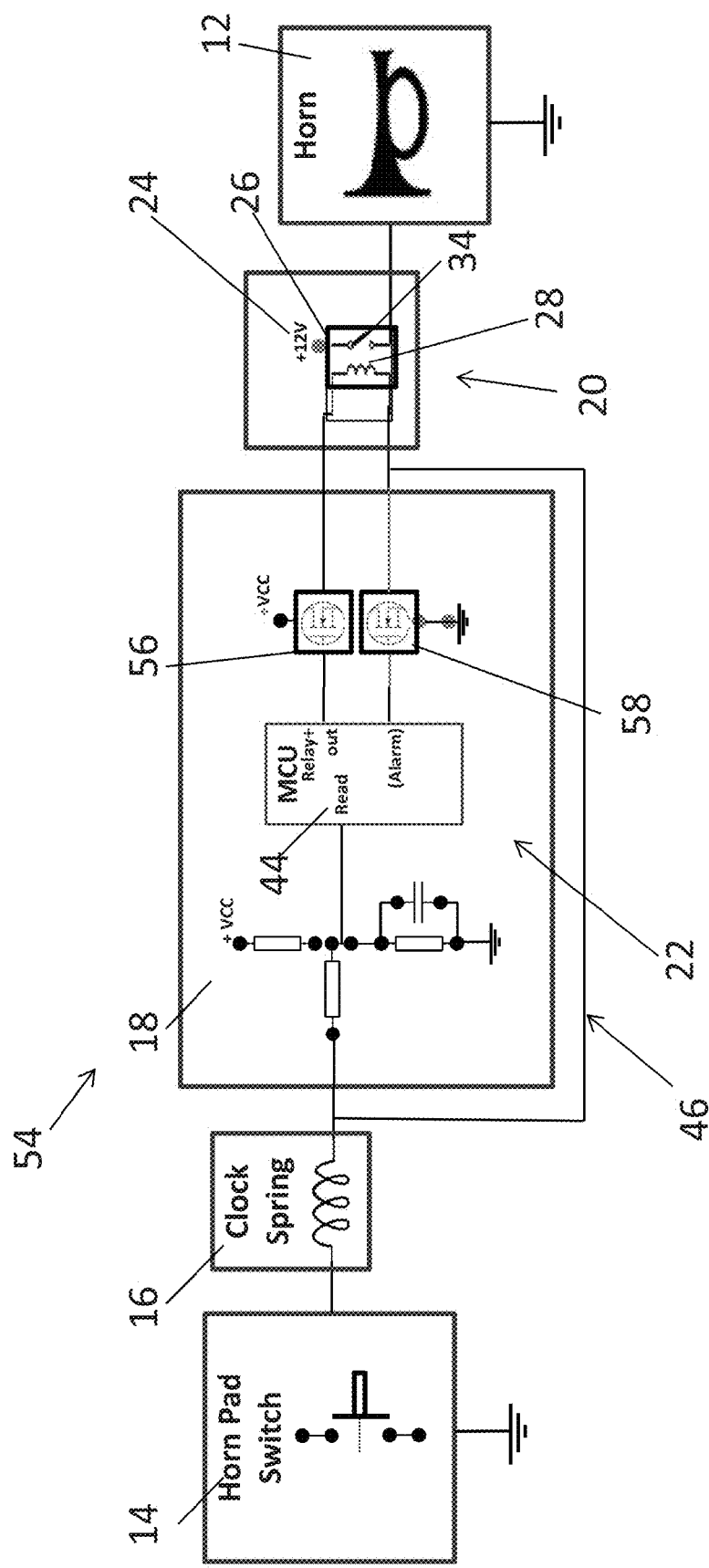
FIG. 2 is a schematic view of an embodiment of a vehicle horn assembly including another embodiment of a system for controlling the vehicle horn.

Referring now to FIG. 2, another embodiment of a vehicle horn assembly 54 is illustrated. Assembly 54 is similar to assembly 10. In assembly 10, however, all of the components in current delivery circuit 20 and control circuit 22 are disposed in a single electronic module. In assembly 54, the current delivery circuit 20 is not contained within the module and is instead external to the module. Because current delivery circuit 20, and particularly, relay 26 is external to the module, the bipolar junction transistors 48, 50 used in assembly 10 are replaced with field effect transistors 56, 58 for improved isolation of the components of the module. The gate, source and drain terminals of transistors 56, 58 are tied to the same terminals within system 18 as the base, collector and emitter terminals of transistors 48, 50 described hereinabove. The current pathway between horn pad switch 14 and terminal 32 of coil 30 in relay 26 is also formed external to the electronics module and may be formed in a conventional wire harness between clock spring 16 and relay 26.

Figure 3:
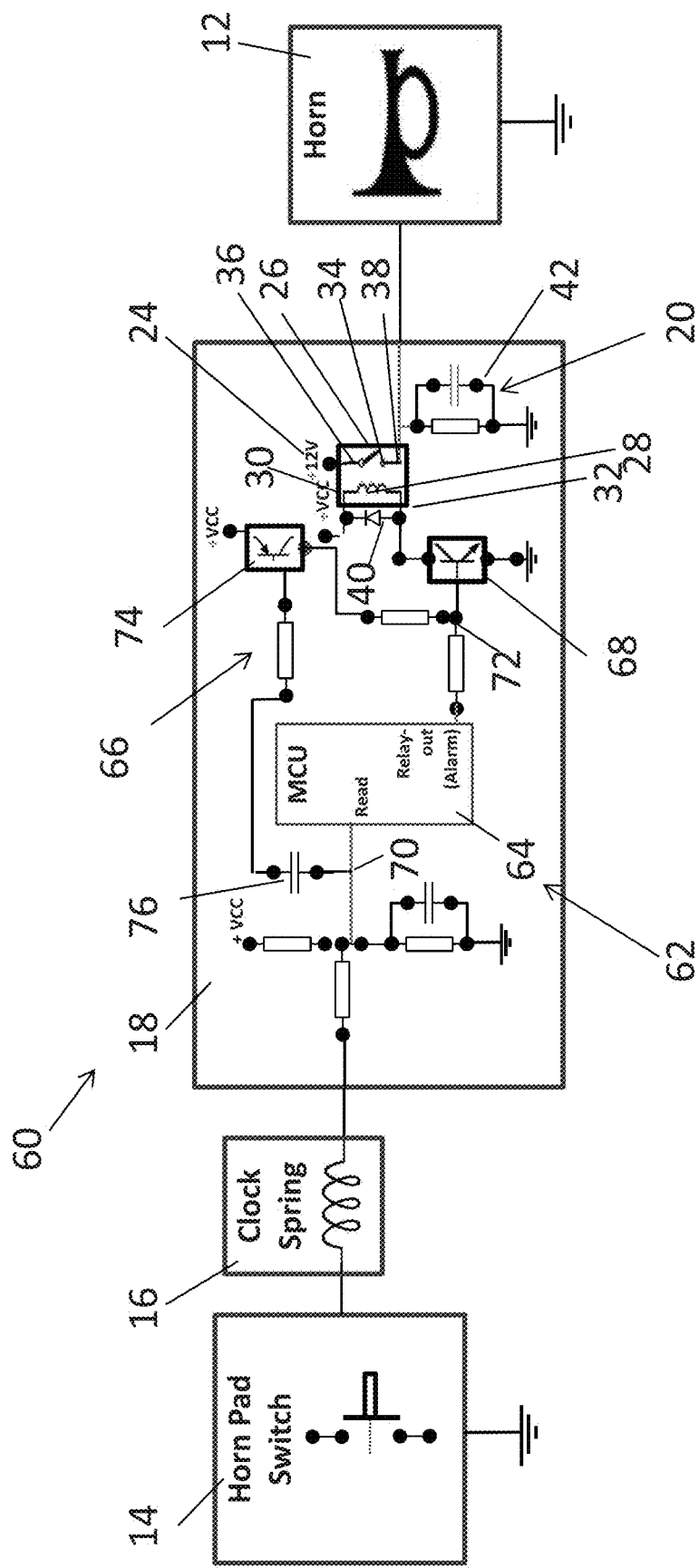
FIG. 3 is a schematic view of an embodiment of a vehicle horn assembly including another embodiment of a system for controlling the vehicle horn.

Referring now to FIG. 3, another embodiment of a vehicle horn assembly 60 is illustrated. Assembly 60 is similar to assembly 10 but includes a modified control circuit 62. Control circuit 62 is provided to control current delivery circuit 20 in response to a horn activation signal received from horn pad switch 14 upon activation of switch 14. Circuit 62 includes control means, such as a control module 64, for generating a horn termination signal if the duration of the horn activation signal exceeds a predetermined duration in order to prevent damage to the horn 12. Circuit 62 also includes bypass means, such as bypass circuit 66, for causing current delivery circuit 20 to deliver current to horn 12 to activate horn 12 responsive to the horn activation signal in the absence of the horn termination signal. Control circuit 62 may also include transistor 68.

Control module 64 generates control signals to control switch 68 in order to activate and deactivate horn 12. Module 64 may include a processing device and a memory device. The processing device may include any type of suitable electronic processor (e.g., a microprocessor, a microcontroller, an application specific integrated circuit (ASIC), etc.) that executes instructions for software, firmware, programs, algorithms, scripts, etc. The memory device may include any type of suitable electronic memory means and may store a variety of data and information including, for example, look-up tables and other data structures; software, firmware, programs, algorithms, scripts, and other electronic instructions, component characteristics and background information, etc. Control module 64 may be electronically connected to other vehicle devices and modules via I/O devices and suitable connections, like a communications bus, so that they can interact as required. Depending on the particular embodiment, control module 64 may be a stand-alone electronic module, it may be incorporated or included within another electronic module in the vehicle (e.g., a steering control module or body control module), or it may be part of a larger network or system.

Module 64 is again configured to generate a horn termination signal if the duration of the horn activation signal from horn pad switch 14 exceeds a predetermined duration. This signal may be output from module 64 to a base or gate terminal of transistor 68 to open transistor 68 and prevent the delivery of current to coil 28 of relay 26, thereby opening contact 34 of relay 26 and preventing the delivery of current to horn 12 from current source 24. Module 64 may also be configured to generate a horn initiation signal if the duration of the horn activation signal is less than the predetermined duration necessary to generate the horn termination signal, but exceeds another predetermined duration less than the duration necessary to generate the horn termination signal. As discussed hereinabove, a control module in a conventional horn control system generates a signal to activate the horn 12 as long as the horn pad switch 14 is actuated for a sufficient period to overcome the debouncing circuit within the control module. Control module 64 may, therefore, generate a horn initiation signal if the horn activation signal exceeds an initial predetermined duration sufficient to overcome the debouncing circuit and then generate a horn termination signal if the horn activation signal continues and exceeds another predetermined duration indicative of potential damage to the horn 12. The horn initiation signal may be output from module 64 to a base or gate terminal of transistor 68 to close transistor 68 and enable delivery of current to coil 28 of relay 26, thereby closing contact 34 of relay 26 and enabling delivery of current to horn 12 from current source 24. Module 64 may again also be configured to generate alarm signals under predetermined conditions. These signals may likewise be output from module 64 to a base or gate terminal of transistor 68 to close transistor 68 and activate horn 12.

Bypass circuit 66 causes current delivery circuit 20 to deliver current to horn 12 in response to a horn activation signal from horn pad switch 14 in order to activate horn 12. Because bypass circuit 66 lacks the debouncing circuit of control module 64, bypass circuit 66 enables activation of horn 12 despite relatively short actuations of horn pad switch 14 that a control module would ignore. Bypass circuit 66 extends between a node 70 on a conductor coupled to an input terminal of control module 64 on which horn activation signal is input to module 64 and a node 72 on a conductor coupled to an output terminal of control module 64 on which the horn initiation and horn termination signals are output from module 64. Circuit 66 includes a transistor 74 and a capacitor 76. Transistor 74 is disposed between a current source and node 72. Transistor 74 may comprise a bipolar junction transistor and, in particular, a PNP transistor with a collector terminal coupled to node 72, an emitter terminal coupled to the current source and a base terminal coupled to capacitor 76. Capacitor 76 has one terminal coupled to the base terminal of transistor 74 and another terminal coupled to node 70. Bypass circuit 66 enables relatively short actuations of horn pad switch 14 to activate horn 12. These short actuations do not generate a horn activation signal with a sufficient duration to overcome the debouncing circuit of control module 64 and trigger the horn initiation signal from module 64. The short horn activation signals do, however, trigger a release of energy from capacitor 76 that closes transistor 74 for a period of time. The closure of transistor 74 delivers a current pulse to transistor 68 during this period to close transistor 68 and establish a current path through which current is provided to coil 28 thereby closing contact 34 and enabling delivery of current from current source 24 to horn 12. The size of capacitor 70 may be selected such that when there is a sufficiently long actuation of switch 14 to cause module 64 to generate the horn initiation signal, there will be overlap between the closing of transistor 68 from bypass circuit 66 and generation of the horn initiation signal from module 64 to thereby avoid any intermission in the sound generated by horn 12.

Transistor 68 is provided to allow or prevent the flow of current to coil 28 under predefined conditions. Transistor 68 may again comprise a bipolar junction transistor and, in particular, a NPN transistor with a collector terminal coupled to terminal 32 of coil 28, an emitter terminal coupled to ground and a base terminal responsive to an output terminal of control module 64. As noted above, transistor 68 may be open in the absence of current from bypass circuit 66 or generation of the horn initiation signal or an alarm signal from module 64. When transistor 68 is closed, a current path is created and current flows through coil 28 to close contact 34 and cause delivery of current from current source 24 to horn 12 to activate horn 12. Transistor 68 will reopen once the horn activation signal terminates or when module 64 generates a horn termination signal.

Figure 4:
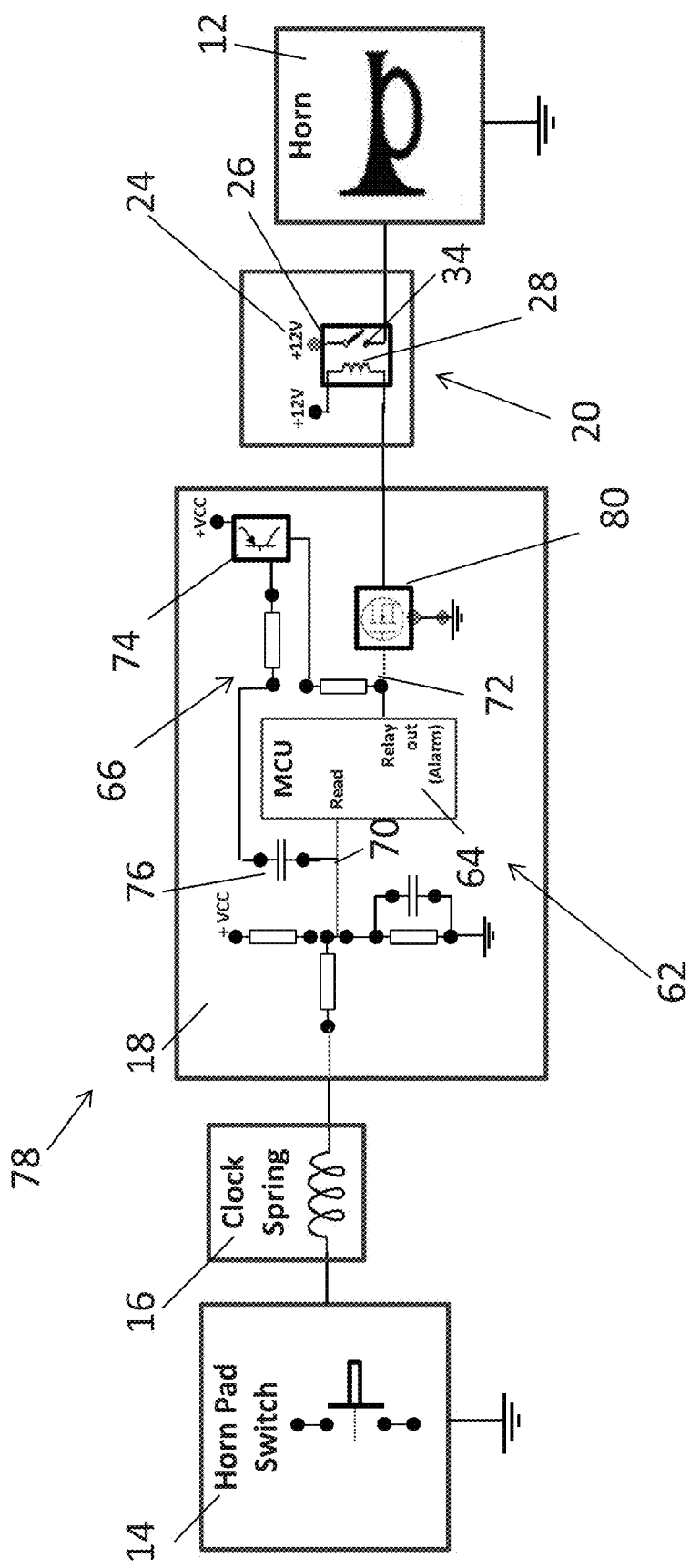
FIG. 4 is a schematic view of an embodiment of a vehicle horn assembly including another embodiment of a system for controlling the vehicle horn.

Referring now to FIG. 4, another embodiment of a vehicle horn assembly 78 is illustrated. Assembly 78 is similar to assembly 60. In assembly 60, however, all of the components in current delivery circuit 20 and control circuit 62 are disposed in a single electronic module. In assembly 78, the current delivery circuit 20 is not contained within the module and is instead external to the module. Because current delivery circuit 20, and particularly, relay 26 is external to the module, the bipolar junction transistor 68 used in assembly 60 is replaced with a field effect transistor 80 for improved isolation of the components of the module. The gate, source and drain terminals of transistor 68 are tied to the same terminals within system 18 as the base, collector and emitter terminals of transistor 68 described hereinabove.

Figure 5:
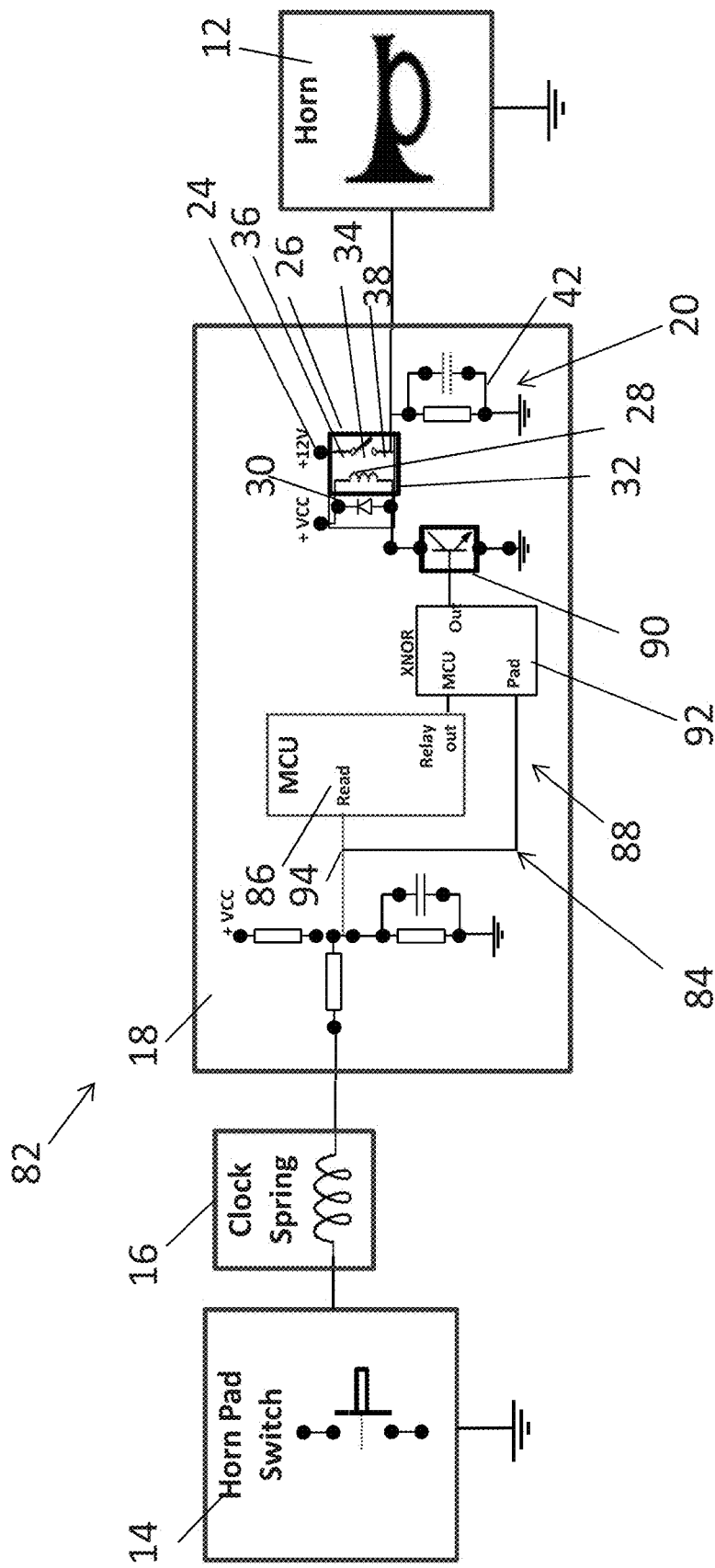
FIG. 5 is a schematic view of an embodiment of a vehicle horn assembly including another embodiment of a system for controlling the vehicle horn.

Referring now to FIG. 5, another embodiment of a vehicle horn assembly 82 is illustrated. Assembly 82 is similar to assembly 10 but includes a modified control circuit 84. Control circuit 84 is again provided to control current delivery circuit 20 in response to a horn activation signal received from horn pad switch 14 upon activation of switch 14. Circuit 84 includes control means, such as a control module 86, for generating a horn termination signal if the duration of the horn activation signal exceeds a predetermined duration in order to prevent damage to the horn 12. Circuit 84 also includes bypass means, such as bypass circuit 88, for causing current delivery circuit 20 to deliver current to horn 12 to activate horn 12 responsive to the horn activation signal in the absence of the horn termination signal. Control circuit 84 may also include transistor 90.

Control module 86 generates control signals to control switch 90 in order to activate and deactivate horn 12. Module 86 may include a processing device and a memory device. The processing device may include any type of suitable electronic processor (e.g., a microprocessor, a microcontroller, an application specific integrated circuit (ASIC), etc.) that executes instructions for software, firmware, programs, algorithms, scripts, etc. The memory device may include any type of suitable electronic memory means and may store a variety of data and information including, for example, look-up tables and other data structures; software, firmware, programs, algorithms, scripts, and other electronic instructions, component characteristics and background information, etc. Control module 86 may be electronically connected to other vehicle devices and modules via I/O devices and suitable connections, like a communications bus, so that they can interact as required. Depending on the particular embodiment, control module 64 may be a stand-alone electronic module, it may be incorporated or included within another electronic module in the vehicle (e.g., a steering control module or body control module), or it may be part of a larger network or system.

Module 86 is again configured to generate a horn termination signal if the duration of the horn activation signal from horn pad switch 14 exceeds a predetermined duration. As discussed below, in response to this signal, bypass circuit 88 may cause transistor 90 to open and prevent the delivery of current to coil 28 of relay 26, thereby opening contact 34 of relay 26 and preventing the delivery of current to horn 12 from current source 24. Module 86 may also again be configured to generate alarm signals to, for example, cause horn 12 to sound an alarm in the event of an attempt to break into the vehicle in which assembly 10 is installed. As discussed below, in response to these signals, bypass circuit 88 may cause transistor 90 to close and enable the delivery of current to coil 28 of relay 26, thereby closing contact 34 of relay 26 and enabling the delivery of current to horn 12 from current source 24.

Bypass circuit 88 again causes, in the absence of a horn termination signal from module 86, current delivery circuit 20 to deliver current to horn 12 in response to a horn activation signal from horn pad switch 14 in order to activate horn 12. Because bypass circuit 88 lacks the debouncing circuit of control module 86, bypass circuit 88 enables activation of horn 12 despite relatively short actuations of horn pad switch 14 that a control module would ignore. In the illustrated embodiment, bypass circuit 88 includes an XNOR gate 92. It should be understood that the particular circuit structure of XNOR gate 92 may vary. Gate 92 has one input terminal coupled to a node 94 on a conductor that is coupled to an input terminal of control module 86 and on which horn activation signal is input to module 86. This input terminal of gate 92 is therefore configured to receive the horn activation signal. Gate 92 has another input terminal coupled to an output terminal of module 86 and configured to receive the horn termination signal and any alarm signals generated by module 86. The output terminal of gate 92 is coupled to a base or gate terminal of transistor 90. Transistor 90 is normally open. Gate 92 generates an output signal configured to closes transistor 90 if: (i) a horn activation signal is present from actuation of horn pad switch 14 and control module 86 has not generated a horn termination signal; or (ii) a horn activation signal is not present (because switch 14 has not been actuated), but control module 86 has generated an alarm signal. Gate 92 generates an output signal configured to open transistor 90 if: (i) a horn activation signal is present from actuation of pad switch 14, but control module 86 has generated a horn activation signal; or (ii) a horn activation signal is not present (because switch 14 has not been actuated) and control module 86 as not generated any alarm signal.

Transistor 90 is provided to allow or prevent the flow of current to coil 28 under predefined conditions. Transistor 90 may again comprise a bipolar junction transistor and, in particular, a NPN transistor with a collector terminal coupled to terminal 32 of coil 28, an emitter terminal coupled to ground and a base terminal coupled to an output terminal of XNOR gate 92. When transistor 90 is closed, a current path is created and current flows through coil 28 to close contact 34 and cause delivery of current from current source 24 to horn 12 to activate horn 12.

Figure 6:
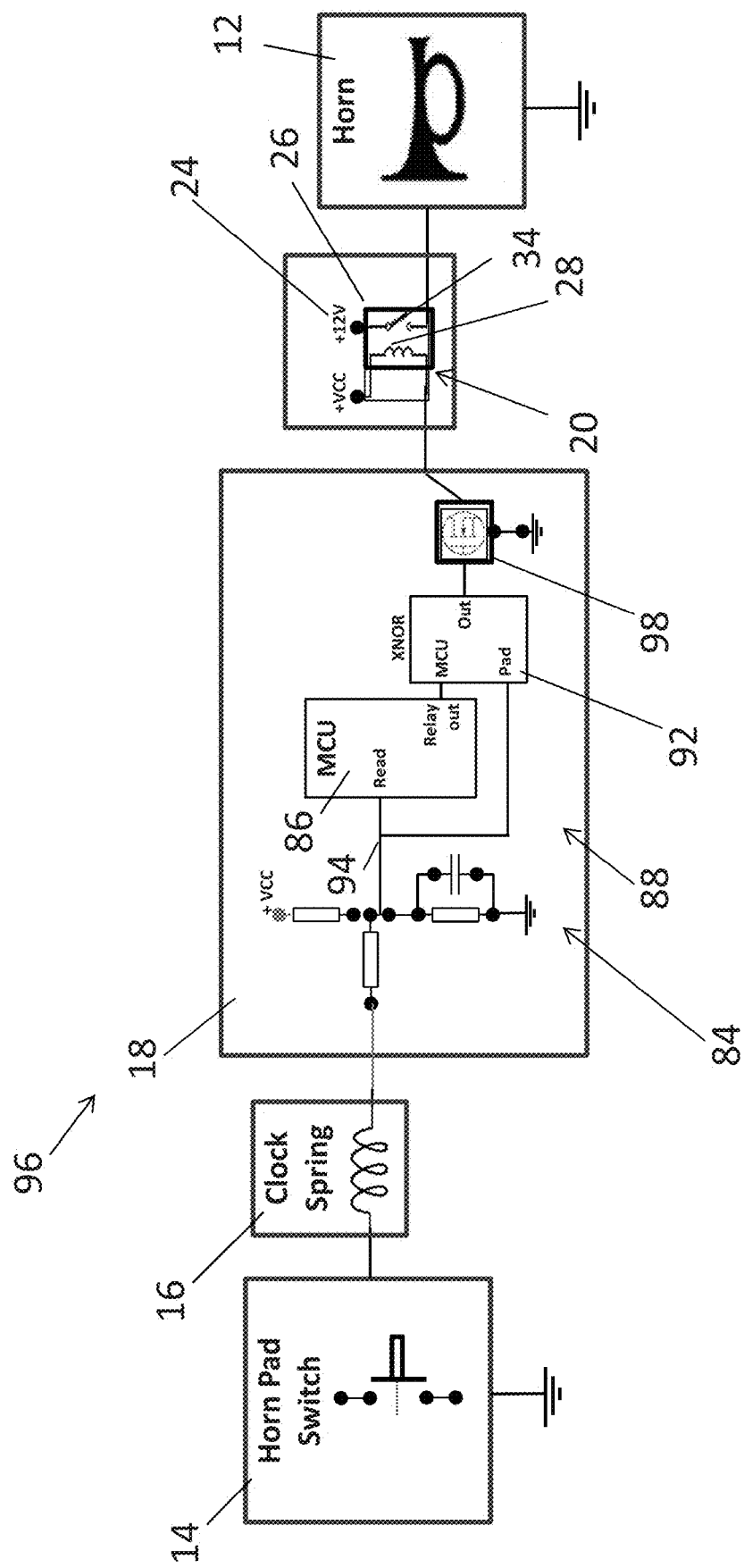
FIG. 6 is a schematic view of an embodiment of a vehicle horn assembly including another embodiment of a system for controlling the vehicle horn.

Referring now to FIG. 6, another embodiment of a vehicle horn assembly 96 is illustrated. Assembly 96 is similar to assembly 82. In assembly 96, however, all of the components in current delivery circuit 20 and control circuit 84 are disposed in a single electronic module. In assembly 96, the current delivery circuit 20 is not contained within the module and is instead external to the module. Because current delivery circuit 20, and particularly, relay 26 is external to the module, the bipolar junction transistor 90 used in assembly 82 is replaced with a field effect transistor 98 for improved isolation of the components of the module. The gate, source and drain terminals of transistor 98 are tied to the same terminals within system 18 as the base, collector and emitter terminals of transistor 90 described hereinabove.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A system for controlling a vehicle horn, comprising:
   a current delivery circuit configured to control delivery of current to said vehicle horn; and
   a control circuit configured to control said current delivery circuit in response to a horn activation signal received from a horn pad switch, said control circuit comprising:
      a control module configured to generate a horn termination signal if a duration of the horn activation signal exceeds a first predetermined duration, the horn termination signal configured to cause said current delivery circuit to prevent delivery of current to the horn to deactivate the horn; and
      a bypass circuit configured to cause said current delivery circuit to deliver current to the horn to activate the horn responsive to said horn activation signal in the absence of said horn termination signal.

2. The system of claim 1 wherein said current delivery circuit includes a relay having a coil with first and second terminals and said bypass circuit defines a current pathway between the horn pad switch and one of said first and second terminals.

3. The system of claim 2 wherein said bypass circuit includes a diode disposed between the horn pad switch and said one terminal.

4. The system of claim 2, wherein said control circuit further includes a transistor coupled to another of said first and second terminals and responsive to said horn termination signal.

5. The system of claim 4 wherein said transistor is disposed between a current source and said another terminal of said coil.

6. The system of claim 4 wherein said transistor is closed in the absence of said horn termination signal to thereby permit current flow from the current source to said coil.

7. The system of claim 1 wherein said control module is configured to generate a horn initiation signal if the duration of the horn activation signal is less than said first predetermined duration and exceeds a second predetermined duration less than said first predetermined duration, the horn initiation signal configured to cause said current delivery circuit to deliver current to said horn to activate the horn.

8. The system of claim 7 wherein the horn activation signal is input to said control module on a first conductor coupled to a first node and the horn initiation and horn termination signals are output from said control module on a second conductor coupled to a second node, and said bypass circuit includes:
   a first transistor disposed between a current source and said second node; and,
   a capacitor having a first terminal coupled to a base or gate terminal of said first transistor and a second terminal coupled to said first node.

9. The system of claim 8 wherein said current delivery circuit includes a relay having a coil with first and second terminals and said control circuit includes a second transistor coupled to one of said first and second terminals and having a base or gate terminal coupled to said second node.

10. The system of claim 1 wherein said bypass circuit comprises an XNOR gate.

11. The system of claim 10 wherein said current delivery circuit includes a relay having a coil with first and second terminals and said control circuit includes a transistor coupled to one of said first and second terminals and having a base or gate terminal coupled to an output terminal of said XNOR gate.

12. The system of claim 11 wherein said XNOR gate has a first input terminal configured to receive said horn activation signal and a second input terminal coupled to an output terminal of said control module and configured to receive said horn termination signal.

13. A system for controlling a vehicle horn, comprising:
   a current delivery circuit configured to control delivery of current to said vehicle horn; and
   a control circuit configured to control said current delivery circuit in response to a horn activation signal received from a horn pad switch, said control circuit comprising:
      control means for generating a horn termination signal if a duration of the horn activation signal exceeds a first predetermined duration, the horn termination signal configured to cause said current delivery circuit to prevent delivery of current to the horn to deactivate the horn; and
      bypass means for causing said current delivery circuit to deliver current to the horn to activate the horn responsive to said horn activation signal in the absence of said horn termination signal.

14. The system of claim 13 wherein said current delivery circuit includes a relay having a coil with first and second terminals and said bypass means defines a current pathway between the horn pad switch and one of said first and second terminals.

15. The system of claim 14, wherein said control circuit further includes a transistor disposed between a current source and another of said first and second terminals and responsive to said horn termination signal, said transistor closed in the absence of said horn termination signal to thereby permit current flow from the current source to said coil.

16. The system of claim 13 wherein said control means is configured to generate a horn initiation signal if the duration of the horn activation signal is less than said first predetermined duration and exceeds a second predetermined duration less than said first predetermined duration, the horn initiation signal configured to cause said current delivery circuit to deliver current to said horn to activate the horn.

17. The system of claim 16 wherein the horn activation signal is input to said control means on a first conductor coupled to a first node and the horn initiation and horn termination signals are output from said control means on a second conductor coupled to a second node, and said bypass means includes:
 a first transistor disposed between a current source and said second node; and,
 a capacitor having a first terminal coupled to a base or gate terminal of said first transistor and a second terminal coupled to said first node.

18. The system of claim 17 wherein said current delivery circuit includes a relay having a coil with first and second terminals and said control circuit includes a second transistor coupled to one of said first and second terminals and having a base or gate terminal coupled to said second node.

19. The system of claim 13 wherein said bypass means comprises an XNOR gate, said current delivery circuit includes a relay having a coil with first and second terminals and said control circuit includes a transistor coupled to one of said first and second terminals and having a base or gate terminal coupled to an output terminal of said XNOR gate and said XNOR gate has a first input terminal configured to receive said horn activation signal and a second input terminal coupled to an output terminal of said control means and configured to receive said horn termination signal.

20. A vehicle horn assembly, comprising:
 a horn;
 a horn pad switch; and
 a system for controlling the horn, comprising:
  a current delivery circuit configured to control delivery of current to said horn; and
  a control circuit configured to control said current delivery circuit in response to a horn activation signal received from a horn pad switch, said control circuit comprising:
   a control module configured to generate a horn termination signal if a duration of the horn activation signal exceeds a first predetermined duration, the horn termination signal configured to cause said current delivery circuit to prevent delivery of current to the horn to deactivate the horn; and
   a bypass circuit configured to cause said current delivery circuit to deliver current to the horn to activate the horn responsive to said horn activation signal in the absence of said horn termination signal.

\* \* \* \* \*